United States Patent
Li (10) Patent No.: US 9,011,986 B2
(45) Date of Patent: Apr. 21, 2015

(54) HYDROGEN PASSIVATION INDUCED DISPERSION OF CARBON NANOTUBES AND GRAPHENE

(71) Applicant: University of South Carolina, Columbia, SC (US)

(72) Inventor: Xiaodong Li, Irmo, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 13/771,518

(22) Filed: Feb. 20, 2013

(65) Prior Publication Data

US 2013/0216732 A1    Aug. 22, 2013

Related U.S. Application Data

(60) Provisional application No. 61/633,933, filed on Feb. 21, 2012.

(51) Int. Cl.
| | |
|---|---|
| *B06B 1/00* | (2006.01) |
| *B01J 19/10* | (2006.01) |
| *B05D 5/00* | (2006.01) |
| *B82Y 40/00* | (2011.01) |

(52) U.S. Cl.
CPC . *B01J 19/10* (2013.01); *B05D 5/00* (2013.01); *B82Y 40/00* (2013.01)

(58) Field of Classification Search
USPC .......................................................... 427/600
See application file for complete search history.

(56) References Cited

U.S. PATENT DOCUMENTS

2005/0025694 A1 *   2/2005   Zhang et al. ................ 423/447.1

OTHER PUBLICATIONS

Pekker et al., Hydrogenation of Carbon Nanotubes and Graphite in Liquid Ammonia, j. Phys. Chem B, 2001, 105, 7938-7943.*
Ma et al, Dispersion and functionalization of carbon nanotubes for polymer-based nanocomposites: A review, Composites: Part A, 41 (2010) 1345-1367.*
Yang et al., Hydrogen Passivation Induced Dispersion of Multi-Walled Carbon Nanotubes, Advanced Materials, Jan. 17, 2012, 24, p. 881-885.*
Tai at al., "Enhancement of the Mechanical Properties of Carbon Nanotube/Phenolic Composites Using a Carbon Nanotube Network as the Reinforcement", Carbon, 2004, vol. 42, pp. 2735-2777.
Ogasawara et al., "Characterization of Multi-Walled Carbon Nanotube/Phenylethynyl Terminated Polyimide Composites", Composites: Part A, 2004, vol. 35, pp. 67-74.

(Continued)

*Primary Examiner* — Dah-Wei D Yuan
*Assistant Examiner* — Nga Leung V Law
(74) *Attorney, Agent, or Firm* — Dority & Manning, P.A.

(57) ABSTRACT

Methods for dispersing carbon nanoparticles in a media (e.g., an alcohol such as ethanol, a resin such as an epoxy, etc.) are generally provided. The method can include: immersing the carbon nanoparticles into the media, and ultrasonicating the media containing the carbon nanoparticles in the presence of hydrogen gas source. The carbon nanoparticles have dangling bonds on the surface of the carbon nanoparticles, such that the dangling bonds on the surface of adjacent carbon nanoparticles are covalently bonded to each other. Upon ultrasonicating the media containing the carbon nanoparticles in the presence of hydrogen gas source (e.g., hydrogen gas), the dangling bonds on the surface of the carbon nanoparticles are replaced with carbon-hydrogen bonds.

18 Claims, 5 Drawing Sheets

(56) References Cited

OTHER PUBLICATIONS

Gojny et al., "Carbon Nanotube-Reinforced Epoxy-Composites: Enhanced Stiffness and Fracture Toughness at Low Nanotube Content", Composites Science and Technology, 2004, vol. 64, pp. 2363-2371.

Dai et al., "Nanotube as Nanoprobes in Scanning Probe Microscopy", Nature, 1996, vol. 384, pp. 147-150.

Sugie et al., "Carbon Nanotubes as Electron Source in an X-Ray Tube" Applied Physics Letters, 2001, vol. 78, pp. 2578-2580.

Lui et al., "Hydrogen Storage in Single-Walled Caron Nanotubes at Room Temperature." Science, 1999, vol. 286, Issue 5442, pp. 1127-1130.

Frackowiak et al., "Electrochemical Storage of Energy in Carbon Nanotubes and Nanostructured Carbons", Carbon, 2002, vol. 40, pp. 1775-1787.

Tans et al., "Electron-Electron Correlations in Carbon Nanotubes", Nature, 1998, vol. 394, pp. 761-764.

Wang et al., "Solubilization of Carbon Nanotubes by Nafion toward the Preparation of Amperometric Biosensors", Journal of American Chemical Society, 2003, vol. 125, pp. 2408-2409.

Vaisman et al., "The Role of Surfactants in Dispersion of Carbon Nanotubes", Advances in Colloid and Interface Science, 2006, vol. 128-130, pp. 37-46.

Hedberg et al., "Air Flow Technique for Large Scale Dispersion and Alignment of Carbon Nanotubes on Various Substrates", Applied Physics Letters, 2005, vol. 86, pp. 143111-1-143111-3.

Kahn et al., "Solubilization of Oxidized Single-Walled Carbon Nanotubes in Organic and Aqueous Solvents through Organic Derivatization", Nano Letters, 2002, vol. 2, No. 11, pp. 1215-1218.

Sano et al., "Self-Organization of PEO-graft-Single-Walled Carbon Nanotubes in Solutions and Langmuir—Blodgett Films", Langmuir, 2001, vol. 17, No. 17, pp. 5125-5128.

Pompeo et al., "Water Solubilization of Single-Walled Carbon Nontubes by Functionalization with Glucosamine", Nano Letters, 2002, vol. 2, No. 4, pp. 369-373.

Islam et al., "High Weight Fraction Surfactant Solubilization of Single-Wall Carbon Nanotubes in Water", Nano Letters, 2003, vol. 3, No. 2, pp. 269-273.

Fagan et al., "Comparative Measures of Single-Wall Carbon Nanotube Dispersion", Journal of Physical Chemistry B, 2006, vol. 110, pp. 23801-23805.

Zheng et al., "DNA-Assisted Dispersion and Separation of Carbon Nanotubes", Nature Materials, 2003, vol. 2, pp. 338-342.

Atalla et al., "Stabilization of Silicon Surfaces by Thermally Grown Oxides", The Bell System Technical Journal, 1959, vol. 38, pp. 749-783.

Nicollian, "Surface Passivation of Semiconductors", Journal of Vacuum Science and Technology, 1971, vol. 8, pp. S39-S49.

Weber et al., "Dangling-Bond Defects and Hydrogen Passivation in Germanium", Applied Physics Letters, 2007, vol. 91, pp. 142101-1-142101-3.

Stesmans, "Passivation of Pb0 and Pb1 Interface Defects in Thermal (100) Si/SiO2 with Molecular Hydrogen", Applied Physics Letters, 1996, vol. 68, pp. 2076-2078.

Márques et al., "Carbon Nanospheres: Synthesis, Physicochemical Properties and Applications", Journal of Materials Chemistry, 2011, vol. 21, pp. 1664-1672.

Messina et al., "Character of the Reaction between Molecular Hydrogen and a Silicon Dangling Bond in Amorphous $SiO_2$", Journal of Physical Chemistry C, 2007, vol. 111, pp. 6663-6667.

Pan et al., "Very Long Carbon Nanotubes", Nature, 1998, vol. 394, pp. 631-632.

Gu et al., "Aligned Carbon Nanotube-Reinforced Silicon Carbide Composites Produced by Chemical Vapor Infiltration", Carbon, 2011, vol. 49, pp. 2475-2482.

Adamson, A Textbook of Physical Chemistry, New York 1973, p. 186.

Okpalugo et al., "High Resolution XPS Characterization of Chemical Functionalised MWCNTs and SWCNTs", Carbon, 2005, vol. 43, pp. 153-161.

Nikitin et al, "Hydrogenation of Single-Walled Carbon Nanotubes", Physical Review Letters, 2005, vol. 95, pp. 225507-1-225507-4.

Arellano et al., "Interaction of Molecular and Atomic Hydrogen with (5,5) and (6,6) Single-Walled Carbon Nanotubes", The Journal of Chemical Physics, 2002, vol. 117, pp. 2281-2288.

Wang et al., "A Treatment Method to Give Separated Multi-Walled Carbon Nanotubes with High Purity, High Crystallization and a Large Aspect Ratio", Carbon, 2003, vol. 41, pp. 2939-2948.

Ni et al., "Elastic Modulus of Amorphous SiO2 Nanowires", Applied Physics Letters, 2006, vol. 88, pp. 043108-1-043108-3.

Yang et al., "Water Molecule-Induced Stiffening in ZnO Nanobelts", Nano Letters, 2011, vol. 11, pp. 2845-2848.

Wagner et al., "Stress-Induced Fragmentation of Multiwall Carbon Nanotubes in a Polymer Matrix", Applied Physics Letters, 1998, vol. 72, pp. 188-190.

Gong et al., "Surfactant-Assisted Processing of Carbon Nanotube/Polymer Composites", Chemical Materials, 2000, vol. 12, pp. 1049-1052.

Ruan et al., "Toughening High Performance Ultrahigh Molecular Weight Polyethylene Using Multiwalled Carbon Nanotubes", Polymer, 2003, vol. 44, pp. 5643-5654.

Thostenson et al., "Aligned Multi-Walled Carbon Nanotube-Reinforced Composites: Processing and Mechanical Characterization", Journal of Physics D: Applied Physics, 2002, vol. 35, pp. L77-L80.

Li et al., "Nanomechanical Characterization of Single-Walled Carbon Nanotube Reinforced Epoxy Composites", Nanotechnolgy, 2004, vol. 15, pp. 1416-1423.

Yang et al., "Hydrogen passivation Induced Dispersion of Multi-Walled Carbon Nanotubes", Advanced Materials, 2012, vol. 24, pp. 881-885.

* cited by examiner

HYDROGEN PASSIVATION INDUCED DISPERSION OF CARBON NANOTUBES AND GRAPHENE

PRIORITY INFORMATION

The present application claims priority to U.S. Provisional Patent Application Ser. No. 61/633,933 titled "Hydrogen Passivation Induced Dispersion of Carbon Nanotubes and Graphene" of Xiaodong Li filed on Feb. 21, 2012, the disclosure of which is incorporated by reference herein.

GOVERNMENT SUPPORT CLAUSE

This invention was made with government support under CMMI-1129979, CMMI-0968843, and CMMI-0824728 awarded by the National Science Foundation. The government has certain rights in the invention.

BACKGROUND

The exceptional mechanical, superior thermal and electrical properties of carbon nanotubes (CNTs) have made them promising for many engineering applications, such as composite reinforcements, scanning probe tips, field emission sources, hydrogen storage systems, super-capacitors, quantum devices, and biosensors. A significant challenge for both fundamental research and practical applications of CNTs is to disperse CNTs into certain media, such as ethanol, water, or polymers. Since CNTs are insoluble and have the propensity to form bundles due to their strong hydrophobicity and van der Waals attractions, a great deal of effort has been invested to develop efficient and low-cost approaches to realize full dispersion of CNTs.

Approaches can be divided into two categories, namely mechanical dispersion and surface modification. Mechanical methods, such as ultrasonication, high shear mixing, and ball milling, have been commonly employed to disperse one kind of material into another, including CNTs. The shear mixing approach uses a shear force produced by air flow in conjunction with a rapidly moving fluid to disperse and align CNTs. The torque produced by the shear force can make CNTs aligned and straightened along the axial direction. Although the shear mixing method is faster in aligning CNTs, only a marginal proportion of CNTs were completely separated. Ultrasonication and ball milling can also be used to disperse CNTs in solutions or polymers. These two methods are easy to operate but usually take long time to disperse CNTs with low-efficiency. During intensive ultrasonication and ball milling, CNT fracture failure often occurs, which destroys the integrity of the dispersed CNTs. Surface modification can be either chemical or physical. Chemical surface modification enables the CNT surface to be functionalized through reactions with atoms or molecules such as fluorine, alkanes, or by ionic modification to improve their chemical compatibility. Wetting or adhesion characteristics of CNTs can be altered through functionalization to reduce their tendency to agglomerate. For example, an amine group or dangling amine moieties can easily form amide bonds by interacting with carboxylic groups located at the ends, sidewalls, and defect sites of the oxidized CNTs and further induce the formation of salt. This method has been proven to be effective in terms of making CNT solution stable and preventing them from aggregating in the solution state. However, such dispersed CNTs tend to clump together after drying. Physical surface modification is the noncovalent stabilization of CNTs by interaction with certain solvents, such as surfactants, polymers, and biomolecules. For instance, sodium dodecylbenzene sulfonate was used as surfactant to assist the dispersion of CNTs. A major drawback of both chemical and physical surface modifications is that impurity is often introduced into the CNT solution, which is difficult to remove in further processes or applications.

Surface passivation has been widely used to treat semiconductor materials to minimize the surface contribution of the semiconductors to the electrical properties of the device. For example, it is well-known that hydrogen can interact with the dangling bonds (DBs) of Si to form Si—H bonds and thus passivate the density surface of Si, which is primarily in the form of DBs and harmful to Si device performance. However, there are no known reports on dispersion of CNTs using hydrogen passivation (HP).

SUMMARY

Objects and advantages of the invention will be set forth in part in the following description, or may be obvious from the description, or may be learned through practice of the invention.

Methods are generally provided for dispersing carbon nanoparticles, each carbon nanoparticle defining a surface having a dangling bond, in a media (e.g., an alcohol such as ethanol, a resin such as an epoxy, etc.). In one embodiment, the method can include: immersing the carbon nanoparticles into the media, and ultrasonicating the media containing the carbon nanoparticles in the presence of hydrogen gas source. The carbon nanoparticles have dangling bonds on the surface of the carbon nanoparticles, such that the dangling bonds on the surface of adjacent carbon nanoparticles are covalently bonded to each other. Upon ultrasonicating the media containing the carbon nanoparticles in the presence of hydrogen gas source (e.g., hydrogen gas), the dangling bonds on the surface of the carbon nanoparticles are replaced with carbon-hydrogen bonds.

For example, ultrasonicating the media containing the carbon nanoparticles can be achieved by irradiating the media containing the carbon nanoparticles with sound waves having a frequency and a power sufficient to break van der Waals force interaction between adjacent carbon nanoparticles and/or sufficient to break interaction of dangling bonds between adjacent carbon nanoparticles. In certain embodiments, the media containing the carbon nanoparticles is irradiated with sound waves having a frequency of about 20 kHz to about 350 kHz and/or sound waves having a power of about 80 watts to about 1,100 watts.

The media containing the carbon nanoparticles can be, in particular embodiments, ultrasonicated in the presence of hydrogen for a period of about 30 minutes to about 5 hours, such as for a period of about 1 hour to about 3.5 hours.

In embodiments where the hydrogen gas source includes hydrogen gas, the media containing the carbon nanoparticles can be irradiated with sound waves having a frequency and a power sufficient to break hydrogen-hydrogen bonds in the hydrogen gas.

The carbon nanoparticles can be any suitable nanoparticles, including but not limited to carbon nano-tubes (e.g., multi-walled carbon nano-tubes, double-walled carbon nanotubes, single-walled carbon nanotubes, or a mixture thereof), graphene, carbon nanofibers, or mixtures thereof.

In one embodiment, the method can further include, after ultrasonicating, applying the media containing the carbon nanoparticles to a surface. Likewise, the media containing the carbon nanoparticles can be heated to release the hydrogen absorbed by the carbon nanoparticles, such as to at least about 550° C.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 5(a) shows a SEM image of pure epoxy resin;

FIG. 5(b) shows a low magnification SEM image of the MWCNTs well-dispersed in epoxy resin;

FIG. 5(c)-(e) show high magnification SEM images of individual MWCNTs well-dispersed in epoxy resin;

Repeat use of reference characters in the present specification and drawings is intended to represent the same or analogous features or elements of the present invention.

DETAILED DESCRIPTION

The following description and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the following description is by way of example only, and is not intended to limit the invention.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

A method is generally provided for dispersing carbon nanoparticles (e.g., multi-walled carbon nanotubes (MWCNTs)) in a media (e.g., a solvent, a polymeric resin, etc.) through the combination of hydrogen passivation and mild ultrasonication. This method is a form of surface passivation of the dangling bondes (DBs) on the carbon nanoparticles through hydrogen interaction/reaction with the dangling bonds. Generally, each dangling bond on the carbon nanoparticles is an unsatisfied valence on an immobilised carbon atom of the nanoparticle. Specifically, dangling bonds are a result of the carbon atoms in the individual carbon nanoparticles that possess too few bonding partners to satisfy their valences and thus have an unpaired electron (i.e., a free radical). For example, CNTs formed from a graphene sheet have DBs due to the unclosed shells with rather waving flakes that follow the curvature of the tubes and create many open edges on the surface.

In a media, DBs on the surface of one carbon nanoparticle interact with and bond to DBs on the surface of an adjacent carbon nanoparticle. Thus, the adjacent carbon nanoparticles are held together via attraction forces, namely van der Waals interaction forces and C—C covelant bonds formed between the DBs on adjacent nanoparticles. As such, the carbon nanoparticles agglomerate in the media and are resistant to dispersion therein.

However, these same DBs provide the carbon nanoparticles (e.g., CNTs) with a high chemical activity and the probability to uptake hydrogen, which can be used to passivate carbon nanoparticles for the dispersion purpose. Hydrogen atoms absorbed by the carbon nanoparticles can be either in the physisorption state, where the hydrogen molecules are bonded with the exterior carbon nanoparticles surface via weak van der Waals interaction, or in the chemisorption state, where hydrogen atom is chemically bonded with carbon atom of the carbon nanoparticles.

As stated above, two main barriers exist that need to be overcome for the dispersion of carbon nanoparticles: the van der Waals force between the carbon nanoparticles and the C—C bonds formed in the dangling bonds of the carbon nanoparticles. That is, a dandling bond on the surface of one carbon nanoparticle interacts to bond with a dangling bond on the surface of an adjacent carbon nanoparticle. This interaction has the strength comparable to a carbon-carbon covalent bond, since the carbon atoms on the adjacent carbon nanoparticles are essentially sharing electrons due to the electron deficiency of each dangling bond.

Compared to the C—C bonding, the van der Waals force between carbon nanoparticles is relatively weak and easy to overcome. Therefore, the key to separate the carbon nanoparticle bundles is to break the C—C bonds and let the dangling C-bonds form new more stable bonds with other atoms. The inlet hydrogen atoms serve as a source of the second atoms to form more stable C—H bonds. The following reaction occurs during the HP.

$$C\text{—}C + H_2 \rightarrow 2C\text{—}H \quad (1)$$

Since the bond energy is 347 kJ/mol for C—C, 436.2 kJ/mol for H—H, and 416.3 kJ/mol for C—H, it is clear that additional energy is needed so that the reaction (1) can proceed. This additional energy is provided by the sound energy produced by the ultrasonication treatment. As such, the ultrasonication treatment (i.e., ultrasonication) of the media containing the carbon nanoparticles is conducted in the presence of hydrogen gas source to replace the dangling bonds in the carbon nanoparticles with carbon-hydrogen bonds.

In one embodiment, the media containing the carbon nanoparticles is irradiating with sound waves having a frequency and a power sufficient to break van der Waals force interaction between adjacent carbon nanoparticles. Furthermore, the media containing the carbon nanoparticles is irradiating with sound waves having a frequency and a power sufficient to break interaction of dangling bonds between adjacent carbon nanoparticles. Likewise the media containing the carbon nanoparticles is irradiating with sound waves having a frequency and a power sufficient to break hydrogen-hydrogen bonds in the hydrogen gas. However, the sound waves should not have a frequency and power strong enough to damage the integrety of the individual carbon nanoparticles.

For example, the sound waves can have a frequency of about 20 kHz to about 350 kHz and/or a power of about 80 watts to about 1,100 watts.

Ultrasonication, in the presence of a hydrogen gas source, can be performed for a sufficient period to passify the DBs on the surfaces of the individual carbon nanoparticles. For example, the media containing the carbon nanoparticles can, in certain embodiments, be ultrasonicated in the presence of hydrogen for a period of about 30 minutes to about 5 hours, such as about 1 hour to about 3.5 hours (e.g., about 1.5 hours to about 3 hours).

Figure 4:
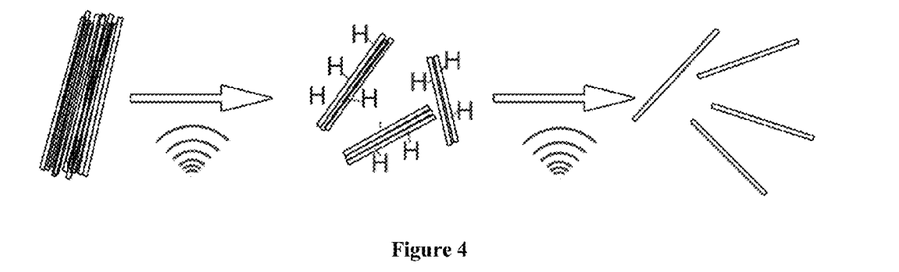
FIG. 4 shows a schematic of MWCNT dispersion process with coupled HP and ultrasonication.

An exemplary dispersion process is schematically shown in FIG. 4 using multi-walled carbon nanotubes (MWCNTs) as representative of similar carbon nanoparticles. The MWCNTs tend to form bundles due to the van der Waals interaction between individual MWCNTs and the C—C bonds formed by the dangling bonds between adjacent MWCNTs. Upon ultrasonication, MWCNTs are agitated by the applied sound energy from ultrasonication. When the applied sound energy is high enough to overcome the van der Waals force and break the C—C bonds in the MWCNTs, the MWCNT bundles start to debond and disperse into the media. If there is no inlet hydrogen during the ultrasonication, the dangling C-bonds formed from the broken C—C bonds may rebind with nearby dangling C-bonds when the ultrasonication is stopped. This will lead to rebundling of the MWCNTs.

However, hydrogen atoms react with the dangling C-bonds, forming more stable C—H bonds. This formation of C—H bonds passivates the MWCNTs and prevents them from bundling together through the formation of the C—C bonds during and after ultrasonication so that excellent dispersion of MWCNTs can be achieved.

After ultrasonicating, the media containing the carbon nanoparticles can be applied to a surface (e.g., a wafer or other substrate), and then heated to release the hydrogen absorbed by the carbon nanoparticles (e.g., to at least about 550° C. (e.g., about 550° C. to about 650° C.). Depending on the media selected, the media can also be evaporated during this heating to leave a substantially uniform layer of carbon nanoparticles on the surface.

This method can be applied to the dispsersion of carbon nanoparticles in a variety of media, such as solvents, polymeric resins, etc. Suitable solvents can include, but are not limited to, alcohols (e.g., methanol, ethanol, propanol, etc.), water, organic solvents, and the like. Polymeric resins can include, but are not limited to, epoxy resins, theromplastic polymeric materials (e.g., polyolefins, polyesters, polyurethanes, etc.), etc.

As discussed in the Examples below, the coupled HP and ultrasonication method developed in this study has several significant advantages compared to the conventional dispersion methods. The new method is very efficient in dispersing MWCNTs. Excellent dispersion of MWCNTs can be achieved with only 2 h ultrasonication after HP, which is much shorter than the conventional ultrasonic method that requires at least 10 h. This method offers opportunities for dispersing a series of materials which tend to bundle together due to dangling bond, such as graphene. Unlike other surface modifications, where MWCNT surface is functionalized by the reactions with atoms or molecules such as fluorine, alkanes, HP adds no impurities that may affect the further application of the dispersed MWCNTs. In fact, the hydrogen adsorbed in MWCNTs can be released at temperature around 600° C. so that none impurities would remain in MWCNTs.

EXAMPLES

In this study, a novel method combining ultrasonication and HP was developed to disperse multi-walled carbon nanotubes (MWCNTs) in both ethanol solution and the epoxy resin. Hydrogen binding to MWCNTs was extremely effective and facile. Excellent dispersion of the MWCNTs was achieved in both media: an ethanol solution and an epoxy resin. Mechanical characterization was performed on individual dispersed MWCNTs by atomic force microscopy (AFM) to measure the elastic modulus of such dispersed MWCNTs. Three-point bending tests of the MWCNT/epoxy nanocomposites produced revealed a remarkable increase in elastic modulus with increasing MWCNT content, suggesting that such coupled HP and mild ultrasonication approach holds a great promise to achieve the theoretically predicted potentials of CNTs in their composites.

Figure 1:
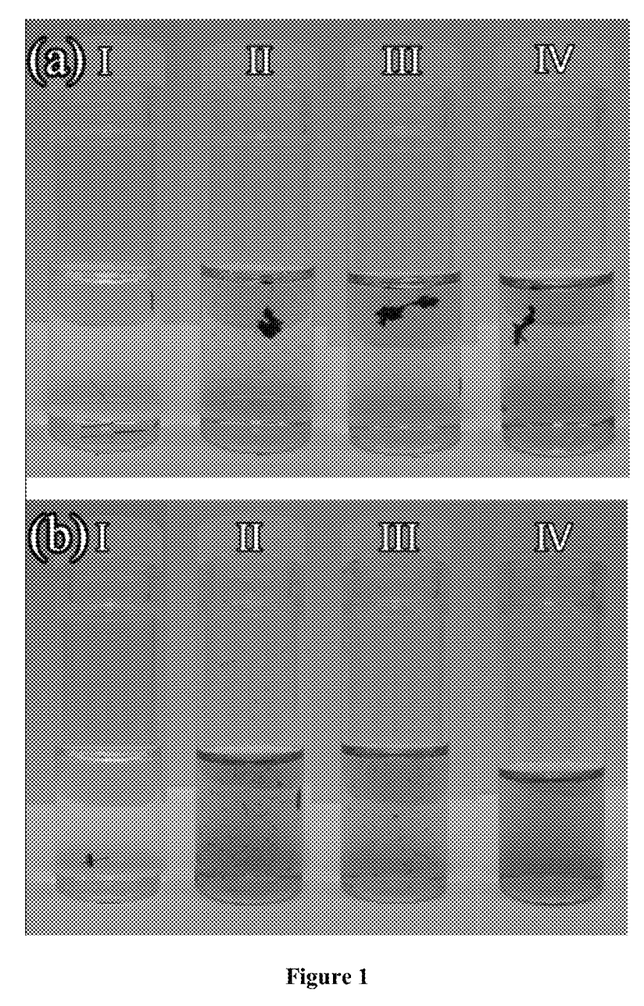
FIG. 1 shows optical images of dispersed multi-walled carbon nanotubes (MWCNTs) with (a) ultrasonication only and (b) coupled HP and ultrasonication for different dispersion time periods, 0 h (I), 0.5 h (II), 1 h (III), and 2 h (IV)
Figure 7:
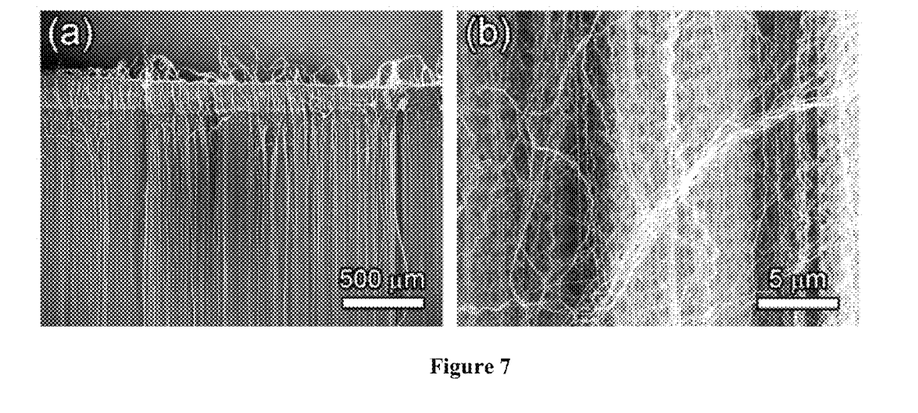
FIG. 7 shows (a) low and (b) high magnification SEM images of an aligned MWCNT sheet.

The MWCNTs used in this study were two millimeter-long well-aligned MWCNT sheets with a thickness of 10-20 μm. Representative SEM images (FIGS. 7a and 7b) of bundled MWCNTs in curved morphology indicate that MWCNTs have good flexibility. FIG. 1 shows the optical images of the dispersed MWCNTs in absolute ethanol with ultrasonication only (FIG. 1a) and with coupled HP and ultrasonication treatment (FIG. 1b). The images were taken after different dispersion time periods, namely 0 h (I), 0.5 h (II), 1 h (III), and 2 h (IV). For dispersion with ultrasonication only (FIG. 1a), majority of the MWCNTs tended to agglomerate and formed floccules in the ethanol solution while only a marginal part of the MWCNTs truly dispersed in the solution, making the solution darker in color. However, for dispersion with coupled HP and ultrasonication (FIG. 1b), the MWCNTs were well dispersed in the solution after HP and 2 h ultrasonication, no MWCNT floccules were found in the ethanol solution, as shown in FIG. 1b-IV.

Figure 2:
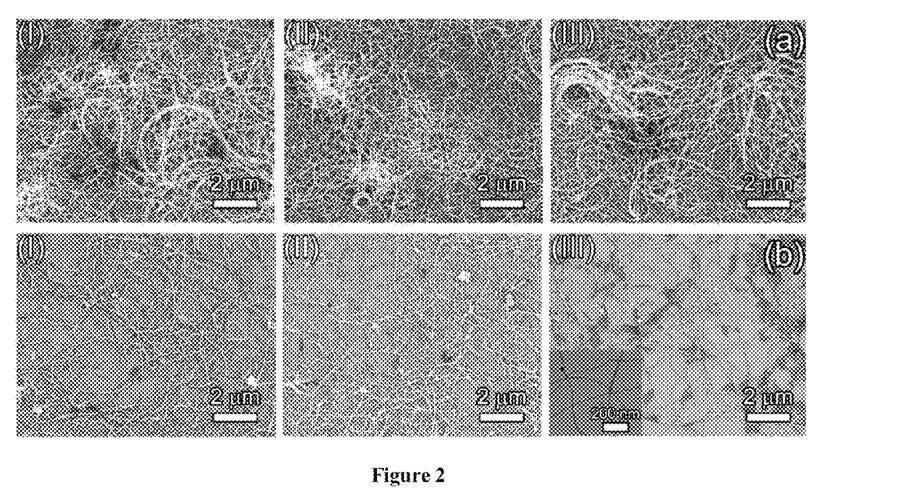
FIG. 2 shows SEM images of dispersed MWCNTs with (a) ultrasonication only and (b) coupled HP and ultrasonication for different dispersion time periods, 0.5 h (I), 1 h (II), and 2 h (III), and inset in FIG. 2(b)(III) is a TEM image of dispersed MWCNTs with coupled HP and 2 h ultrasonication.

FIG. 2 shows the SEM images of the MWCNTs dispersed in ethanol solution after 0.5 h (I), 1 h (II), and 2 h (III) ultrasonication treatment without (FIG. 2a) and with (FIG. 2b) HP. Without HP, the dispersed MWCNTs in ethanol were still agglomerated together even after 2 h ultrasonication (FIG. 2a-III). It is very difficult to manipulate these MWCNT bundles and perform mechanical tests on individual MWCNTs. Contrarily, dispersion of the MWCNTs with HP shows a completely different result. As shown in FIG. 2b, with increasing ultrasonication time, the MWCNTs started to separate from one another and no MWCNT bundles were found. An excellent dispersion of the MWCNTs was achieved for 2 h ultrasonication (see FIG. 2b-III). The insert in FIG. 2b-III, TEM image, also provides evidence for individually dispersed MWCNTs with coupled HP and 2 h ultrasonication. The diameter of the individual MWCNTs is approximately 30 nm. Clearly, almost all the MWCNTs were separated in ethanol solution and can be easily manipulated and tested using AFM to probe their mechanical properties.

To shed light on the mechanism of HP induced MWCNT dispersion, the interaction between the MWCNT and the hydrogen atoms was proposed and also studied in details. Two critical barriers need to be overcome in MWCNT dispersion, i.e., the van der Waals force between MWCNTs and the C—C bonds formed in the dangling bonds of MWCNTs. Compared to the C—C bonding, the van der Waals force between MWCNTs is rather weak and easy to overcome. Therefore, the key to separate the MWCNT bundles is to break the C—C bonds and let the dangling C-bonds form new more stable bonds with other atoms. The inlet hydrogen atoms serve as a source of the second atoms to form more stable C—H bonds. The following reaction occurs during the HP.

$$\text{C—C} + \text{H}_2 \rightarrow 2\text{C—H} \tag{1}$$

Figure 3:
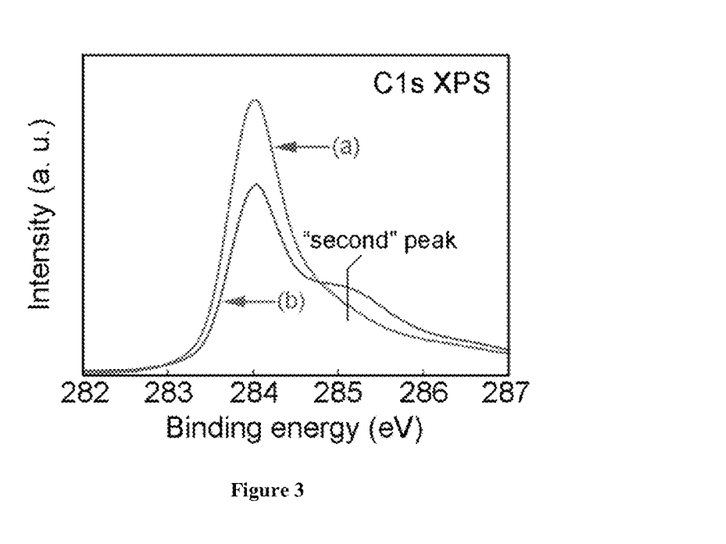
FIG. 3 shows C1s XPS spectra of dispersed MWCNTs with (a) ultrasonication only and (b) coupled HP and ultrasonication for 1 h dispersion.

Since the bond energy is 347 kJ/mol for C—C, 436.2 kJ/mol for H—H, and 416.3 kJ/mol for C—H [26], it is clear that additional energy is needed so that the reaction (1) can proceed. This additional energy is provided by the sound energy produced by the ultrasonication treatment. The formation of C—H bonds under HP was confirmed by XPS analysis of MWCNTs dispersed with and without HP. As shown in FIG. 3, hydrogen interaction led to a dramatic change in the C1s peak shape. For HP (b), an additional C1s peak was recognized as a shoulder at higher binding energy compared to the C1s peak for ultrasonication only (a). This observed binding energy shift between the main peak and the second peak for HP was in accordance with the chemical shift between $sp^2$ and $sp^3$ hybridized carbon species in MWCNT and due to attachment of hydrogen to the C—C bonds resulting in C—H bond formation.

Figure 8:
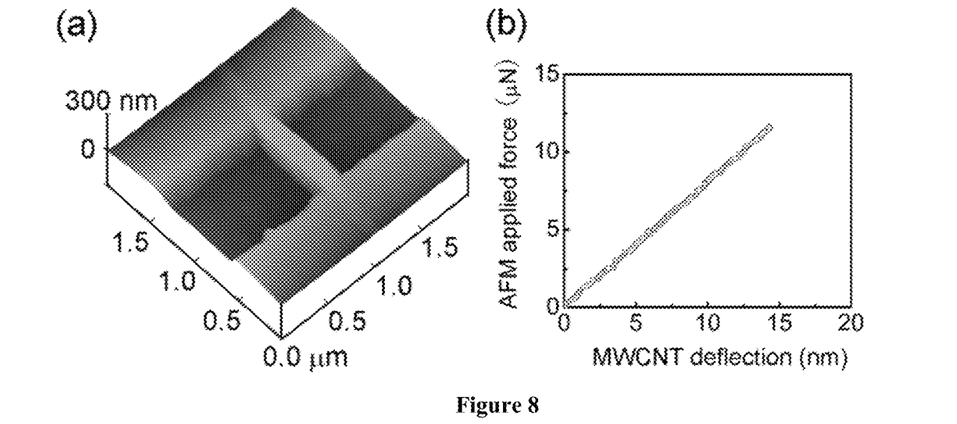
FIG. 8 shows (a) 3D AFM image showing a MWCNT over the trench on the Si wafer, and (b) applied bending force as a function of net MWCNT deflection.

To investigate whether the method of coupled HP and ultrasonication dispersion method impair the dispersed MWCNTs, mechanical characterization of both individual dispersed MWCNTs and the MWCNT/epoxy nanocomposites were carried out. AFM three-point bending tests were performed on individual MWCNTs as shown in FIG. 8a. An initial portion of a typical bending force-deflection curve is shown in FIG. 8b. The linear relationship between the bending force and the deflection of the MWCNT indicates an elastic deformation. The elastic modulus can be calculated from the linear portion of the bending-deflection curve using the following equation.

$$E = \frac{KL^3}{192I} \tag{2}$$

where I, L, and K are the moment of inertia, the suspended length, and the slope of the initial bending force-deflection curve, respectively. The average elastic modulus of the MWCNTs measured by AFM three-point bending is 774±33 GPa. This agrees well with the reported values in literature ranging from 0.3 to ~1 TPa, suggesting that the coupled HP and ultrasonication treatment did not damage the MWCNTs' integrity.

Figure 5:
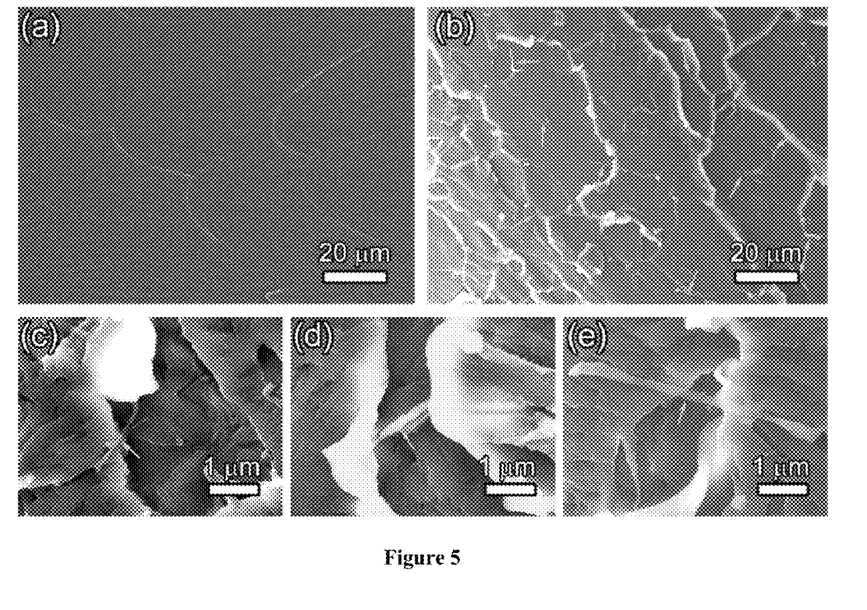

FIG. 5 shows the SEM images of the fresh cleavage surfaces of a pure epoxy resin sample and an MWCNT/epoxy nanocomposite sample. Compared to the smooth fractured surface of the pure epoxy (FIG. 5a), the nanocomposite is rough and consists of many small facets (FIG. 5b). This is expected since the MWCNTs in the nanocomposite highlighted by the arrows in FIG. 5b are randomly distributed in and well bonded with the epoxy matrix. These MWCNTs inhibit fracture of the nanocomposite and thus result in a rougher cleavage surface. FIGS. 5c-e show the high magnification SEM images of individual MWCNTs dispersed in epoxy matrix. As can be seen, the MWCNTs, treated by the developed coupled HP and ultrasonication method, were well dispersed in epoxy matrix.

Figure 6:
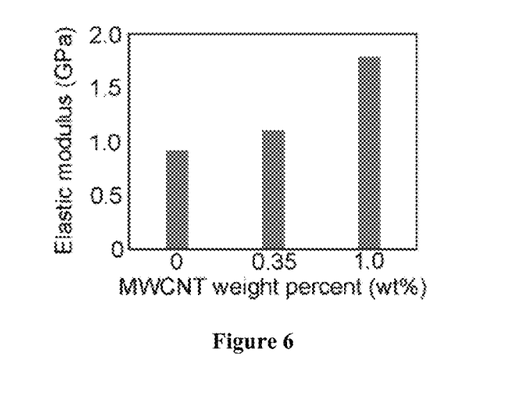
FIG. 6 shows the variation of elastic modulus with MWCNT percentage for MWCNT/epoxy composites.

The elastic modulus of the MWCNT/epoxy nanocomposites determined by three-point bending test is shown in FIG. 6. As expected, the elastic modulus of MWCNT/epoxy composites increases with increasing MWCNT content. The elastic modulus of the control sample (pure epoxy) is 0.92±0.05 GPa. The elastic modulus values of the 0.35 wt. % and 1 wt. % MWCNT reinforced nanocomposites are 1.11±0.04 GPa and 1.79±0.10 GPa, respectively, demonstrating 20% and 94.57% increase compared to the control sample. The mechanical properties of CNT/epoxy nanocomposites are determined by many factors such as the type and content of CNTs, the structure and properties of matrix, the dispersion of CNTs in the matrix, and CNT/matrix interfacial bonding. For comparison, the increased values of elastic modulus for 1 wt. % CNT/polymer composites achieved by different research groups range from 6.62% to 38.4%. In contrast, the 1 wt. % MWCNT/epoxy nanocomposite fabricated by the coupled HP and ultrasonication dispersion method exhibits a surprisingly high increase in elastic modulus of 94.57%, which is 2.5 times higher than the reported values in literature.

In summary, a method for dispersing MWCNTs has been developed by coupling HP and ultrasonication and successfully applied to disperse MWCNTs into absolute ethanol and epoxy resin media. SEM observation revealed that excellent dispersion of MWCNTs has been achieved in both media with 2 h ultrasonication after HP. Three-point bending tests have been performed on both dispersed MWCNTs and the MWCNT/epoxy composites. The elastic modulus of the individual MWCNTs is 774±33 GPa. The elastic modulus values of the 0.35 wt. % and 1 wt. % MWCNT/epoxy composites are 1.11±0.04 GPa and 1.79±0.10 GPa, respectively.

This method can be extended to other carbon materials such as single-walled carbon nanotubes, double-walled carbon nanotubes, graphene, carbon nanoparticles, carbon fibers, and other carbon micro/nanomaterials. The same mechanisms/principals should hold for other carbon micro/nanomaterials.

Experimental Section

Dispersion of MWCNTs in Absolute Ethanol:

The MWCNTs used in this study were two millimeter-long well-aligned MWCNT sheets with a thickness of 10-20 μm. To disperse the MWCNTs in absolute ethanol, ~0.01 g MWCNTs were first immersed into 1 ml ethanol (Sigma-Aldrich) in a glass bottle. Then the glass bottle was put into the basin of an ultrasonicator (Branson 5510, Branson Ultrasonic Corp., Conn., USA). Ultrasoncations were done in two ways, namely with the inlet hydrogen (HP) and in ambient environment. The hydrogen gas was produced by reaction of zinc powder (Sigma-Aldrich) and 0.1 mol/L hydrochloric acid (Fisher Corp.). This gas passed a long steel tube to eliminate any hydrochloric acid vapor.

One drop of the solution was taken out from the glass bottle after 15 min, 30 min, 1 h, and 2 h ultrasonication, and dropped down onto the silicon wafer coated by 20 nm gold film, and the copper grid, respectively, for future study. Scanning electron microscopy (SEM; Zeiss Ultra plus Field Emission Gun (FEG)-SEM) and transmission electron microscopy (TEM; Hitachi H-8000-TEM) were used to examine the effects of the dispersion. To determine the C—H bonds, X-ray photoelectron spectroscopy (XPS; Kratos Axis Ultra DLD) was employed to characterize the CNTs dispersed with and without HP.

Dispersion of MWCNTs in Epoxy Resin:

To produce MWCNT/epoxy composite, MWCNTs were first dispersed in epoxy resin, EPO-TEK 302-3M Part A, (Epoxy Technology, Mass., USA) with 2 h ultrasonication under HP. Then the hardener, EPO-TEK 302-3M Part B, (Epoxy Technology, Mass., USA) was added to the epoxy resin and the mixture was stirred for 30 minutes and cured for 24 hours under ambient condition. The weight proportion of epoxy resin to hardener was 100 to 45 as suggested by the manufacturer. Two epoxy composites reinforced with 0.35 wt. % and 1.0 wt. % MWCNTs were produced in this study. A control sample with 0 wt. % MWCNTs was also fabricated. Fresh cleavage surfaces of both MWCNT/epoxy composites and the control sample were observed to check the morphology and dispersion of the MWCNTs using SEM.

Mechanical Characterization of Individual MWCNTs:

A drop of the ethanol solution with well dispersed MWCNTs was dropped onto a standard AFM reference sample (NGR-21010, Veeco Metrology Group, N.Y., USA) with uniform trenches. Individual MWCNT that bridges a trench was located under SEM. Carbonaceous materials (Alfa Aesar) were deposited on both ends of the MWCNT by electron-beam induced deposition to clamp the MWCNT to prevent any sliding of the MWCNT during the three-point bending test. The bending test was performed by directly indenting the center of the suspended MWCNT with a tapping mode silicon tip using a Veeco Dimension 3100 AFM (Veeco Metrology Group, N.Y., USA). During the test, both applied bending load and the corresponding deflection of the MWCNT was recorded and the initial loading curve was used for the elastic modulus analysis.

Mechanical Characterization of MWCNT/Epoxy Composites:

To measure the elastic modulus of the MWCNT/epoxy composites, three-point bending test was also performed on two composites with 0.35 wt. % and 1 wt. % MWCNTs produced in this study using microtribometer (CETR Inc., Calif., USA). The control sample was also tested for comparison. For each material, six beam samples with the dimension of 30×3×3 mm (length×width×height) were tested. The elastic modulus of the tested materials was calculated from the initial linear portion of the loading curve of the three-point bending test.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of dispersing carbon nanoparticles in a media, each carbon nanoparticle defining a surface having a dangling bond, the method comprising:
   immersing the carbon nanoparticles into the media, wherein the carbon nanoparticles comprise dangling bonds on the surface of the carbon nanoparticles, and wherein the dangling bonds on the surface of adjacent carbon nanoparticles are covalently bonded to each other within the media; and
   ultrasonicating the media containing the carbon nanoparticles in the presence of hydrogen gas to replace the dangling bonds on the surface of the carbon nanoparticles with carbon-hydrogen bonds, wherein ultrasonicating the media containing the carbon nanoparticles comprises irradiating the media containing the carbon nanoparticles with sound waves having a frequency and a power sufficient to break hydrogen-hydrogen bonds in the hydrogen gas.

2. The method as in claim 1, wherein ultrasonicating the media containing the carbon nanoparticles comprises irradiating the media containing the carbon nanoparticles with sound waves having a frequency and a power sufficient to break van der Waals force interaction between adjacent carbon nanoparticles.

3. The method as in claim 2, wherein ultrasonicating the media containing the carbon nanoparticles comprises irradiating the media containing the carbon nanoparticles with sound waves having a frequency and a power sufficient to break interaction of dangling bonds between adjacent carbon nanoparticles.

4. The method as in claim 1, wherein ultrasonicating the media containing the carbon nanoparticles comprises irradiating the media containing the carbon nanoparticles with sound waves having a frequency of about 20 kHz to about 350 kHz.

5. The method as in claim 4, wherein the sound waves have a power of about 80 watts to about 1,100 watts.

6. The method as in claim 1, wherein the media containing the carbon nanoparticles is ultrasonicated in the presence of the hydrogen gas for a period of about 30 minutes to about 5 hours.

7. The method as in claim 1, wherein the media containing the carbon nanoparticles is ultrasonicated in the presence of the hydrogen gas for a period of about 1 hour to about 3.5 hours.

8. The method as in claim 1, wherein the media comprises ethanol.

9. The method as in claim 1, wherein the media comprises a resin.

10. The method as in claim 9, wherein the resin comprises an epoxy.

11. The method as in claim 1, wherein the carbon nanoparticles comprise carbon nano-tubes, graphene, carbon nanofibers, or mixtures thereof.

12. The method as in claim 1, wherein the carbon nanoparticles comprises carbon nano-tubes.

13. The method as in claim 12, wherein the carbon nano-tubes comprise multi-walled carbon nano-tubes, single-walled carbon nanotubes, or a mixture thereof.

14. The method as in claim 12, wherein the carbon nano-tubes comprise multi-walled carbon nano-tubes.

15. The method as in claim 12, wherein the carbon nano-tubes comprise double-walled carbon nano-tubes.

16. The method as in claim 1, further comprising:
   after ultrasonicating, applying the media containing the carbon nanoparticles to a surface.

17. The method as in claim 16, further comprising:
   heating the media containing the carbon nanoparticles to release the hydrogen absorbed by the carbon nanoparticles.

18. The method as in claim 17, wherein the media containing the carbon nanoparticles is heated to at least about 550° C.

* * * * *